(12) United States Patent
Lv et al.

(10) Patent No.: US 10,732,904 B2
(45) Date of Patent: Aug. 4, 2020

(54) METHOD, SYSTEM AND COMPUTER PROGRAM PRODUCT FOR MANAGING STORAGE SYSTEM

(71) Applicant: EMC IP Holding Company LLC, Hopkinton, MA (US)

(72) Inventors: Shuo Lv, Beijing (CN); Wilson Guoyu Hu, Beijing (CN); Bean Bin Zhao, Tianjin (CN); Qiaosheng Zhou, Beijing (CN); Lester Ming Zhang, Beijing (CN); Deric Wenjun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 15/993,719

(22) Filed: May 31, 2018

(65) Prior Publication Data

US 2018/0349034 A1    Dec. 6, 2018

(30) Foreign Application Priority Data

Jun. 2, 2017   (CN) .......................... 2017 1 0407024

(51) Int. Cl.
*G06F 12/00* (2006.01)
*G06F 3/06* (2006.01)
*H04L 12/24* (2006.01)

(52) U.S. Cl.
CPC ............ *G06F 3/067* (2013.01); *G06F 3/0604* (2013.01); *G06F 3/0631* (2013.01);
(Continued)

(58) Field of Classification Search
None
See application file for complete search history.

(56) References Cited

U.S. PATENT DOCUMENTS 9,021,204 B1 *  4/2015  Awasthi ................. G06F 12/08
                                                      711/117
9,619,429 B1 *  4/2017  Wang ............... G06F 15/17331
(Continued)

OTHER PUBLICATIONS

Armangau, Philippe, et al.; "Mitigating Flash Wear When Performing Storage Tiering," U.S. Appl. No. 15/395,685, filed Dec. 30, 2016.
(Continued)

*Primary Examiner* — John A Lane
(74) *Attorney, Agent, or Firm* — BainwoodHuang

(57) ABSTRACT

Implementations of the present disclosure relate to a method, system and computer program product for managing a storage system. Specifically, in one implementation of the present disclosure, there is provided a method for managing a storage system. The method comprises: obtaining topological information of a storage device in a first tier and a storage device in a second tier in the storage system; obtaining a storage rule specifying storage of a data object in the storage device in the first tier or the storage device in the second tier; and in response to determining the storage rule conforming to the topological information, managing the data object in the storage system according to the storage rule. In other implementations of the present disclosure, there is provided a corresponding system and computer program product.

22 Claims, 8 Drawing Sheets

(52) U.S. Cl.
CPC .......... *G06F 3/0647* (2013.01); *G06F 3/0649* (2013.01); *G06F 3/0653* (2013.01); *G06F 3/0685* (2013.01); *H04L 41/12* (2013.01)

(56) References Cited

U.S. PATENT DOCUMENTS

| | | |
|---|---|---|
| 9,959,054 B1 | 5/2018 | Vankamamidi et al. |
| 10,146,469 B2 | 12/2018 | Polkovnikov et al. |
| 10,552,056 B2 | 2/2020 | Marchenko et al. |
| 2004/0107273 A1* | 6/2004 | Biran .................. H04L 67/1029 709/223 |
| 2013/0191531 A1* | 7/2013 | Kruglick ............. H04L 41/5038 709/224 |
| 2018/0083890 A1* | 3/2018 | Ishida ..................... H04L 47/82 |

OTHER PUBLICATIONS

Dalmatov, Nickolay; "Managing a File System Within Multiple LUNs While Different LUN Level Policies Are Applied to the LUNs," U.S. Appl. No. 16/097,761, filed Oct. 30, 2018.

\* cited by examiner

METHOD, SYSTEM AND COMPUTER PROGRAM PRODUCT FOR MANAGING STORAGE SYSTEM

RELATED APPLICATIONS

This application claim priority from Chinese Patent Application Number CN201710407024.2, filed on Jun. 2, 2017 at the State Intellectual Property Office, China, titled "METHOD, SYSTEM AND COMPUTER PROGRAM PRODUCT FOR MANAGING STORAGE SYSTEM" the contents of which is herein incorporated by reference in its entirety.

FIELD

Various implementations of the present invention relate to storage management, and more specifically, to a method and system for managing a storage system, as well as a computer program product.

BACKGROUND

With the development of data storage technology, various data storage devices can provide users with increasingly high data storage capabilities, and also data access speed has been increased greatly. So far a tier-based distributed storage system has been developed, which may consist of different types of storage devices with different response speeds. Users may store files to different types of storage devices.

When the storage space in a storage system becomes insufficient, more storage devices may be added to the storage system so as to expand the storage capacity. When a user imposes a new requirement on the response speed of the storage system, a storage device that meets the user's new requirement may further be added to the storage system. In addition, an existing storage device in the storage system may be replaced or removed. Although technical solutions have been proposed to migrate data between different types of storage devices, these existing technical solutions have poor flexibility, and the migration efficiency cannot satisfy users' demands. Therefore, how to manage data in a storage system more conveniently and efficiently becomes a research focus.

SUMMARY

Therefore, it is desirable to develop and implement a technical solution for managing a storage system more conveniently and efficiently. It is desired that the technical solution can be compatible with existing storage systems and manage a storage system more conveniently and efficiently in light of user demands and/or operation conditions of the storage system.

In one implementation of the present invention, there is provided a method for managing a storage system. The method comprises: obtaining topological information of a storage device in a first tier and a storage device in a second tier in the storage system; obtaining a storage rule specifying storage of a data object in the storage device in the first tier or the storage device in the second tier; and in response to determining the storage rule conforming to the topological information, managing the data object in the storage system according to the storage rule.

In one implementation of the present invention, there is provided a system for managing a storage system. The system comprises: one or more processors; a memory coupled to at least one processor of the one or more processors; computer program instructions stored in the memory which, when executed by the at least one processor, cause the system to execute a method for managing a storage system. The method comprises: obtaining topological information of a storage device in a first tier and a storage device in a second tier in the storage system; obtaining a storage rule specifying storage of a data object in the storage device in the first tier or the storage device in the second tier; and in response to determining the storage rule conforming to the topological information, managing the data object in the storage system according to the storage rule.

In one implementation of the present invention, there is provided a computer program product, tangibly stored on a non-transient computer readable medium and including machine executable instructions which, when being executed, cause the machine to execute steps of the method described above.

In one implementation of the present invention, there is provided a device for managing a storage system. The device comprises: a first obtaining module configured to obtain topological information of a storage device in a first tier and a storage device in a second tier in the storage system; a second obtaining module configured to obtain a storage rule specifying storage of a data object in the storage device in the first tier or the storage device in the second tier; and a management module configured to, in response to determining the storage rule conforming to the topological information, manage the data object in the storage system according to the storage rule.

With the technical solution of the present invention, a storage system can be managed more flexibly and conveniently, and further the storage system may be improved so as to operate in a manner better meeting user demands.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings.

DETAILED DESCRIPTION

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
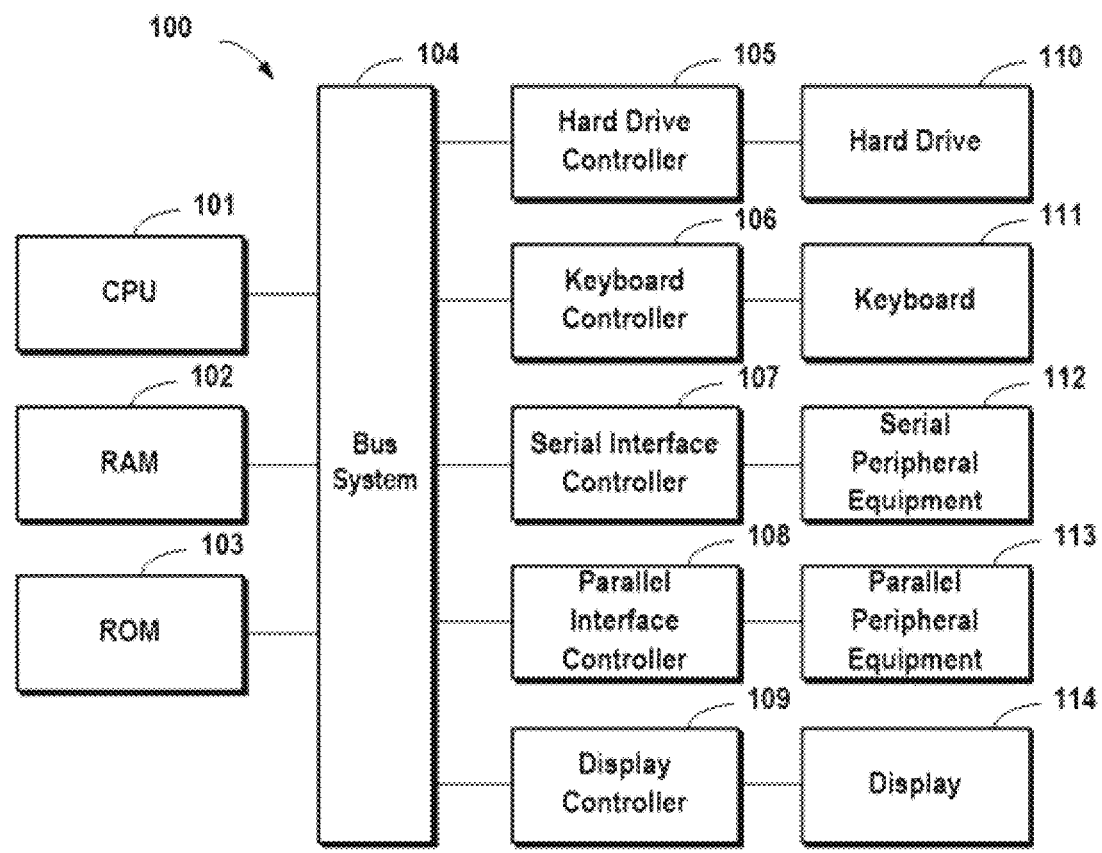
FIG. 1 schematically illustrates a block diagram of an exemplary computer system which is applicable to implement the implementations of the present disclosure.

FIG. 1 illustrates an exemplary computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those skilled in the art should understand that illustrated above is just a typical example of an application environment where the various implementations of the present invention can be implemented. Throughout the context of the present invention, the implementations of the present invention may be implemented in various application environments that are known already or to be developed later.

Cloud-based storage systems have been developed so far. At this point, a user does not need to care about a concrete physical position of an accessed storage device, but he/she may store a data object to or access a data object from a cloud storage system on the basis of an interface provided by the cloud storage system. However, existing storage systems do not support to flexibly expand and shrink a physical storage device in them.

In view of the drawbacks in existing storage systems, the present disclosure proposes a method for managing a storage system. According to one implementation of the present disclosure, the storage system comprises a storage device in a first tier and a storage device in a second tier. Topological information of a storage device in the storage system may be obtained, and a storage rule specifying storage of a data object in the storage device in the first tier or the storage device in the second tier may be obtained. In response to determining that the storage rule conforms to the topological information, the data object may be managed in the storage system according to the storage rule.

In this implementation, since topological information of a storage device in the storage system may be obtained dynamically, when a storage device in the storage system changes (e.g., a new storage device is added or an existing storage device is removed), a data object may be managed on the basis of updated topological information. Further, a user-defined storage rule may be supported in this implementation, so as to specify in which place of the storage system the data object may be stored (e.g., in which tier of storage device the data object is stored). Therefore, more flexibility is provided for management of the storage system.

Figure 2:
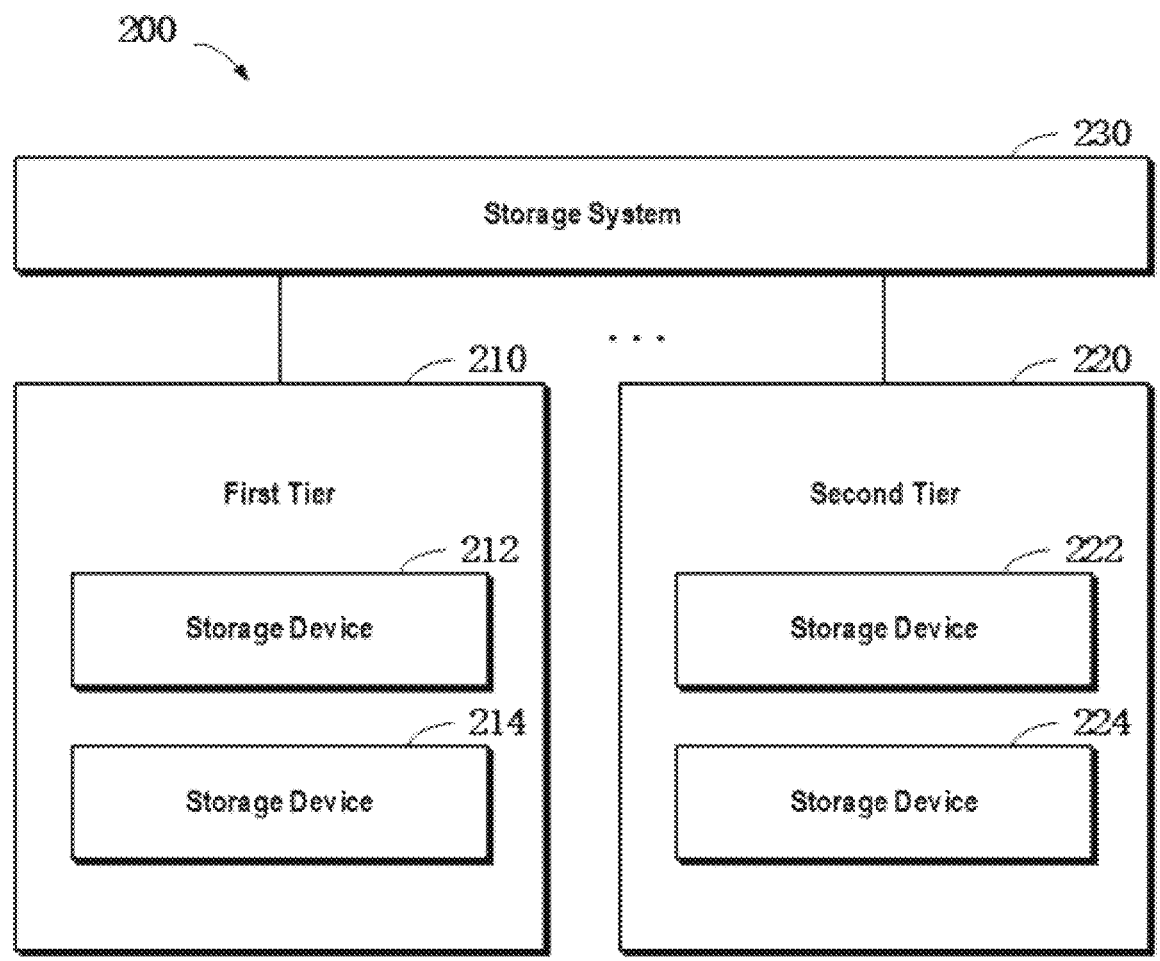
FIG. 2 schematically illustrates a block diagram of a storage system according to one implementation of the present disclosure.

FIG. 2 schematically shows a block diagram 200 of a storage system according to one implementation of the present disclosure. As shown in this figure, a storage system 230 may comprise multiple storage devices in different tiers. For example, the storage system 230 may comprise storage devices 212 and 214 in a first tier 210, and may comprise storage devices 222 and 224 in a second tier 220. It is noteworthy although FIG. 2 shows only two tiers 210 and 220 at each of which there exist only two storage devices, in other storage system there may be comprised more tiers and each tier may comprise more or less storage devices.

In the implementation of the present disclosure, topological information refers to information that describes a dynamic mapping relationship between each storage device and the storage system 230. For example, in the storage system 230 as shown in FIG. 2, topological information may describe a topological relationship between the storage system 230 and the tiers 210 and 220, the storage devices 212, 214, 222 and 224. When a storage device in a specific tier is dynamically added to/removed from the storage system 230, the topological information may be updated in real time so as to describe the topological relationship after the addition/removal. When necessary, topological information of various storage devices in the storage system 230 may be obtained, and a subsequent operation may be performed on the basis of the topological information.

Figure 3:
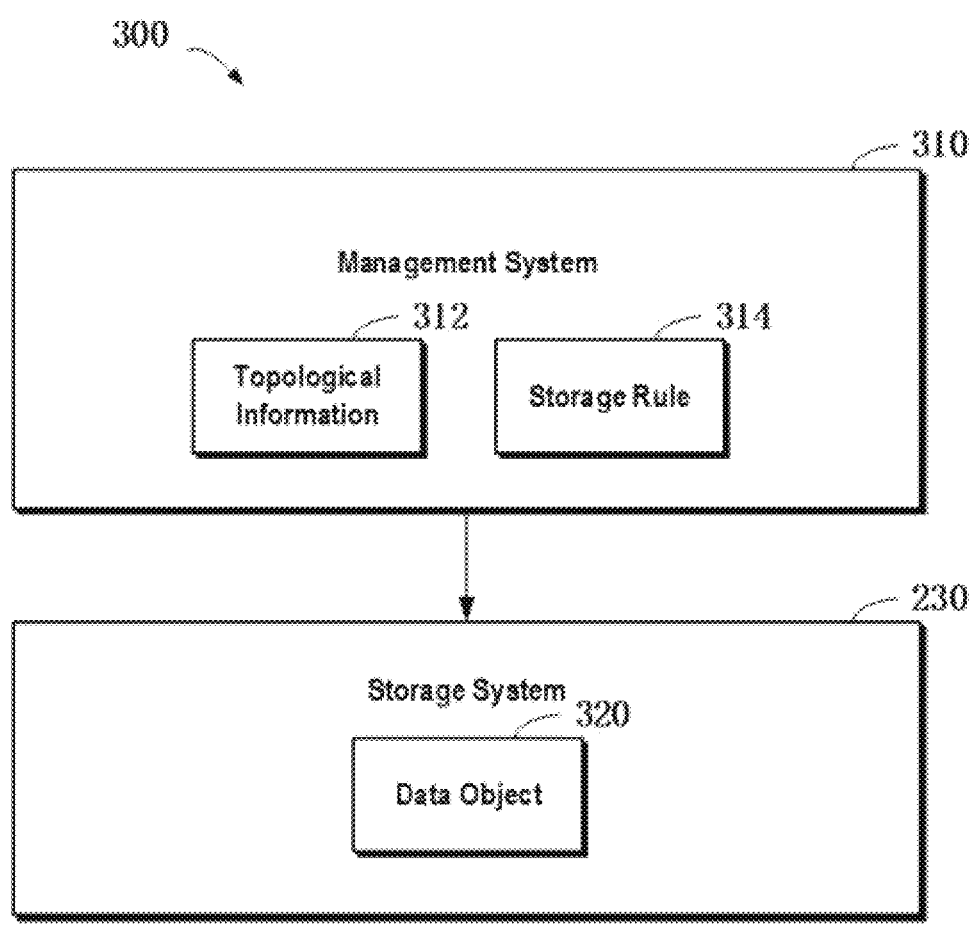
FIG. 3 schematically illustrates a block diagram of the architecture of a management system for managing a storage system according to one implementation of the present disclosure.

FIG. 3 schematically shows a block diagram 300 of the architecture of a management system 310 for managing a storage system according to one implementation of the present disclosure. As shown in this figure, the management system 310 may check obtained topological information 312 and storage rule 314 to determine whether they match each other. If the storage rule 314 conforms to the topological information 312, then a data object 320 in the storage system 230 may be managed on the basis of the storage rule 314. In this implementation, the topological information 312 may be stored in various formats, for example, may be stored using Extensible Markup Language (XML). In this implementation, a graphical interface may further be provided to a user of the storage system 230, for editing the storage rule 314.

Figure 4:
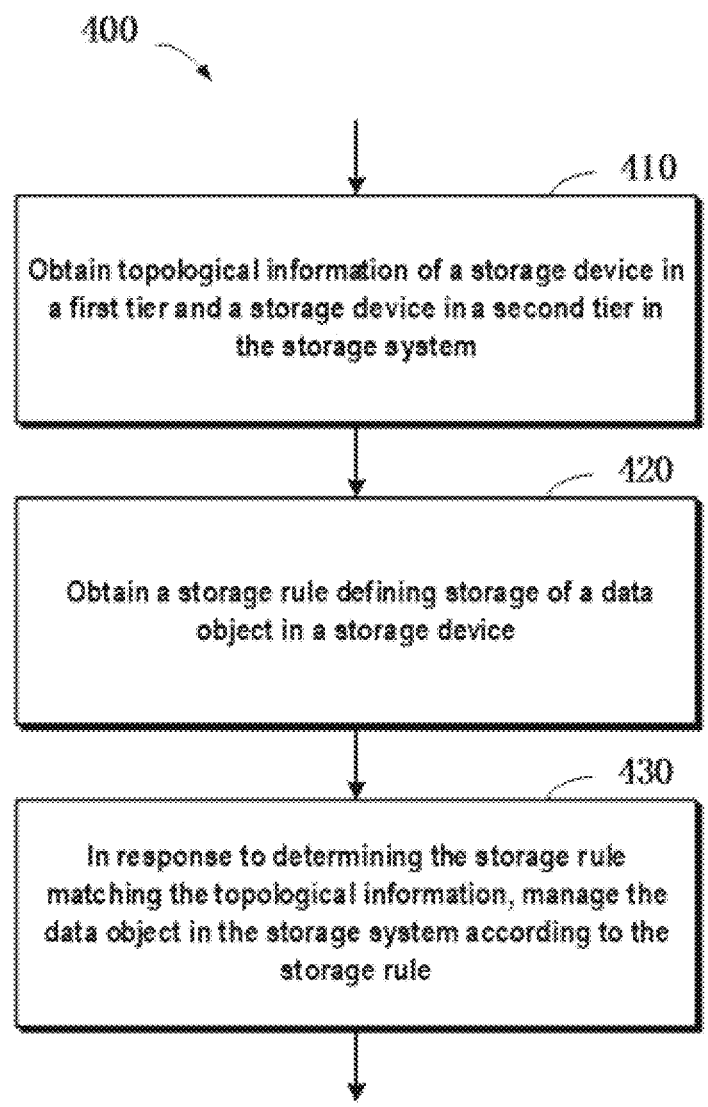
FIG. 4 schematically illustrates a flowchart of a method for managing a storage system according to one implementation of the present disclosure.

More details of the implementation of the present disclosure will be described with reference to FIG. 4 to FIG. 8. FIG. 4 shows a flowchart of a method 400 for managing the storage system 230 according to one implementation of the present disclosure. In block 410, the topological information 312 of the storage devices in the first and second tiers in the storage system 230 may be obtained. In an example of the storage system 230 shown in FIG. 2, the obtained topological information 312 may describe the system architecture as shown in FIG. 2. Specifically, the topological information 312 may be obtained on the basis of mapping information of various tiers and storage devices in the storage system 230. A concrete example of the topological information 312 is shown in Table 1 below.

TABLE 1

Example of Topological Information

```
   <TIER_DEVICE_MAP>
     <TINFO>
       <NR_TIERS>3</NR_TIERS>
       <NR_DEVICES>5</NR_DEVICES>
 5   </TINFO>
     <DEV_TIER>
       <DEVICE>/dev/md1</DEVICE> <TIER>1</TIER>
       <DEVICE>/dev/md2</DEVICE> <TIER>1</TIER>
       <DEVICE>/dev/md3</DEVICE> <TIER>2</TIER>
10     <DEVICE>/dev/md3</DEVICE> <TIER>3</TIER>
       <DEVICE>/dev/md4</DEVICE> <TIER>3</TIER>
       <DEVICE>/dev/md5</DEVICE> <TIER>3</TIER>
     </DEV_TIER>
   </TIER_DEVICE_MAP>
```

The example in Table 1 is shown in the form of XML, wherein the $3^{rd}$ row shows the storage system 230 comprises 3 tiers, and the $4^{th}$ row shows the storage system 230 comprises 5 storage devices. The $6^{th}$ to $13^{th}$ rows define a serial number of a tier of each storage device, for example, the $7^{th}$ row shows a storage device "dev/md1" is in tier "1". Further, various storage devices and tiers may be described using data structures "eats_device_info" and "eats_tier_dev_info" shown in Table 2 below. It is noteworthy that both Table 1 and Table 2 show exemplary structures only. Those skilled in the art may use other implementation in light of requirements of a concrete application environment.

TABLE 2

Exemplary Data Structure

```
struct eats_device_info {
    unsigned int dev_num;    /* device number*/
    unsigned char tier;       /* Tier to which it belongs */
    unsigned long long begin; /* begining of the device*/
    unsigned long long len;   /* length of the device*/
    unsigned int blkgrp_start; /* start block group of the device*/
    unsigned int blkgrp_end;   /* end block group of the device*/
    char dev_name[MAX_DEV_NAME_LEN];   /* device name*/
};
struct eats_tier_dev_info {
    unsigned int nr_tiers;
    unsigned int nr_devices;
    unsigned int dinfo_count;
    struct eats_device_info device[EATS_MAX_PV_PER_LVM];
};
```

In block 420 in FIG. 2, a storage rule specifying storage of a data object in the storage device in the first tier or the storage device in the second tier in the storage system is obtained. The storage rule here may comprise multiple types. For example, a storage rule for placement may define a rule regarding the placement of a data object (e.g., may describe in which place of the storage system a data object is stored). For another example, a storage rule for migration may define in which circumstance a migration operation is triggered in the storage system and to which place a data object is migrated.

Specifically, an example describing the storage rule for placement is illustrated in Table 3 below.

TABLE 3

Example of Storage Rule for Placement

```
     <ALLOC_POLICY>
        <AINFO>
           <NR_USERS>1</NR_USERS>
           <NR_GROUPS>2</NR_GROUPS>
 5         <NR_TYPES>4<NR_TYPES>
           <NR_DIRS>1</NR_DIRS>
        </AINFO>
        <USERS>
           <USER>0</USER> <TIER>1</TIER>
10      </USERS>
        <GROUPS>
           <GROUP>101</GROUP> <TIER>1</TIER>
           <GROUP>103</GROUP> <TIER>3</TIER>
        </GROUPS>
15      <TYPES>
           <TYPE>c</TYPE> <TIER>1</TIER>
           <TYPE>ksh</TYPE> <TIER>2</TIER>
           <TYPE>xml</TYPE> <TIER>2</TIER>
           <TYPE>o</TYPE> <TIER>1</TIER>
20      </TYPES>
        <DIRS>
           <DIR>/sandeep</DIR> <TIER>1</TIER>
        </DIRS>
     </ALLOC_POLICY>
```

The storage rule may specify contents in various aspects, e.g., may specify which users' data objects are placed in a specific tier in the storage system 230, may specify data objects of users in which groups are placed in a specific tier in the storage system 230, may specify which types of data objects (e.g., identified according to file suffixes) are placed in a specific tier in the storage system 230, may specify data objects in which directories are placed in a specific tier in the storage system 230, etc.

For example, the $8^{th}$ to $10^{th}$ rows in Table 3 define that a data object of user 0 is placed in tier 1 in the storage system 230; the $11^{th}$ row defines that a data object of a user in group 101 is placed in tier 1; the $16^{th}$ row defines that a data object with a suffix of ".c" is placed in tier 1; the $21^{st}$ row defines that a data object in a directory "sandeep" is placed in tier 1.

Further, an example of the storage rule 314 for migration is illustrated in Table 4 below, where it is defined in which conditions a migration operation is performed. For example, the $7^{th}$ to $9^{th}$ rows show a data object is migrated from tier 1 to tier 2 if the following conditions are met: when the size of the data object satisfies a specific threshold, the frequency of modification to data satisfies a specific threshold, the frequency of access to data satisfies a specific threshold.

TABLE 4

Example of Storage Rule for Migration

```
     <RELOC_POLICY>
        <NR_RULES>1</NR_RULES>
        <RULE>
           <FROM>1</FROM>
 5         <TO>2</TO>
           <WHEN>
              <FSIZE>50</FSIZE><REL>GT</REL>
              <FMA>50</FMA><REL>GT</REL>
              <FAA>50</FAA><REL>GT</REL>
10         </WHEN>
        </RULE>
     </RELOC_POLICY>
```

In one implementation of the present disclosure, a rule may be described using a data structure as shown in Table 5. It is noteworthy that Table 3 to Table 5 merely illustrate examples of the storage rule 314. In other implementations, those skilled in the art may further use other patterns.

TABLE 5

Exemplary Data Structure

```
struct eats_relocation_policy {
    unsigned char reloc_criteria_bitmap;
    unsigned char src_tier;
    unsigned char dest_tier;
    unsigned char rel_ops[EATS_MAX_POLICIES];
    long long values[EATS_MAX_POLICIES];
};
```

Still referring to the method shown in FIG. 4, in block 430, in response to the storage rule 314 conforming to the topological information 312, the data object 320 in the storage system 230 is managed according to the storage rule 314. It is noteworthy that a storage device might be added to or removed from the storage system 230 at any time, so some storage devices or tiers defined in the storage rule 314 might not exist in the storage system 230. In view of this, first it should be determined that the storage rule 314 conforms to the actual topological information 312 in the storage system 230. If any unconformity is found, exception handling may be invoked or other manual intervention may be executed. A subsequent operation will be performed only when the storage rule 314 conforms to the topological information 312.

In one implementation of the present disclosure, in response to the topological information 312 comprising a storage device in a tier specified in the storage rule 314, it is determined that the storage rule 314 conforms to the topological information 312. Specifically, continuing the example shown in Table 3 above, it may be verified that all tiers 1, 2 and 3 defined in the storage rule of Table 3 exist in the topological information 312 defined in Table 1. At this point, it may be determined that the storage rule 314 conforms to the topological information 312.

Figure 5:
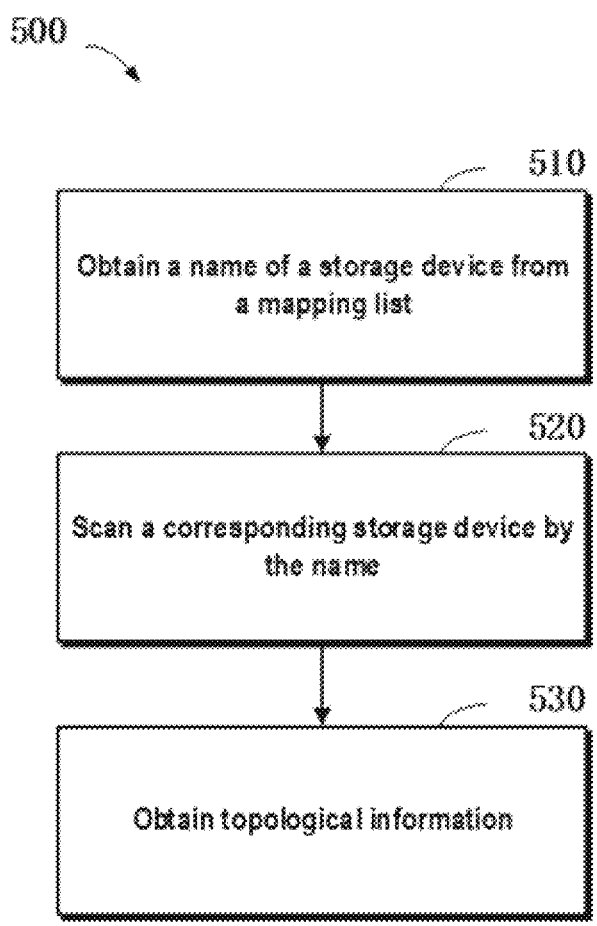
FIG. 5 schematically illustrates a flowchart of a method for obtaining topological information of a storage device in a storage system according to one implementation of the present disclosure.

FIG. 5 schematically shows a flowchart of a method 500 for obtaining the topological information 312 of a storage device in the storage system 230. In block 510, a name of a storage device may be obtained from a mapping list describing a mapping relationship between the storage system 230 and various storage devices. Subsequently, the storage system 230 is scanned by the name to determine whether or not there exists a storage device corresponding to the name. If yes, the storage device may be added to the topological information 312. Otherwise, a scan is performed by a next name. In this way, the topological information 312 may be obtained in block 530.

In one implementation of the present disclosure, if a storage request for storing the data object 320 to the storage system 230 is received, the data object 320 may be stored in the storage system 230. Specifically, in a storage device in a tier specified by the storage rule 314, at least one data block may be allocated for the data object 320. Furthermore, an index node may be inserted into indexes of the storage system 230, the index node being linked to at least one data block.

In this implementation, a corresponding storage device may be selected according to a tier specified in the storage rule 314, so as to store the data object 320. Such a case might arise that the available space in a storage device in a tier specified in the storage system 230 is insufficient. Suppose it is specified in the storage rule 314 that a data object of user 0 is stored to a storage device in tier 1. However, if the storage device in tier 1 has been occupied and has no available storage space for accommodating the data object 320, then one or more data blocks in a storage device in other tier may be allocated for the data object 320 in a predefined order of priorities. At this point, an index node may be inserted into indexes to record an association relationship between the data object 320 and the allocated one or more data blocks.

Figure 6:
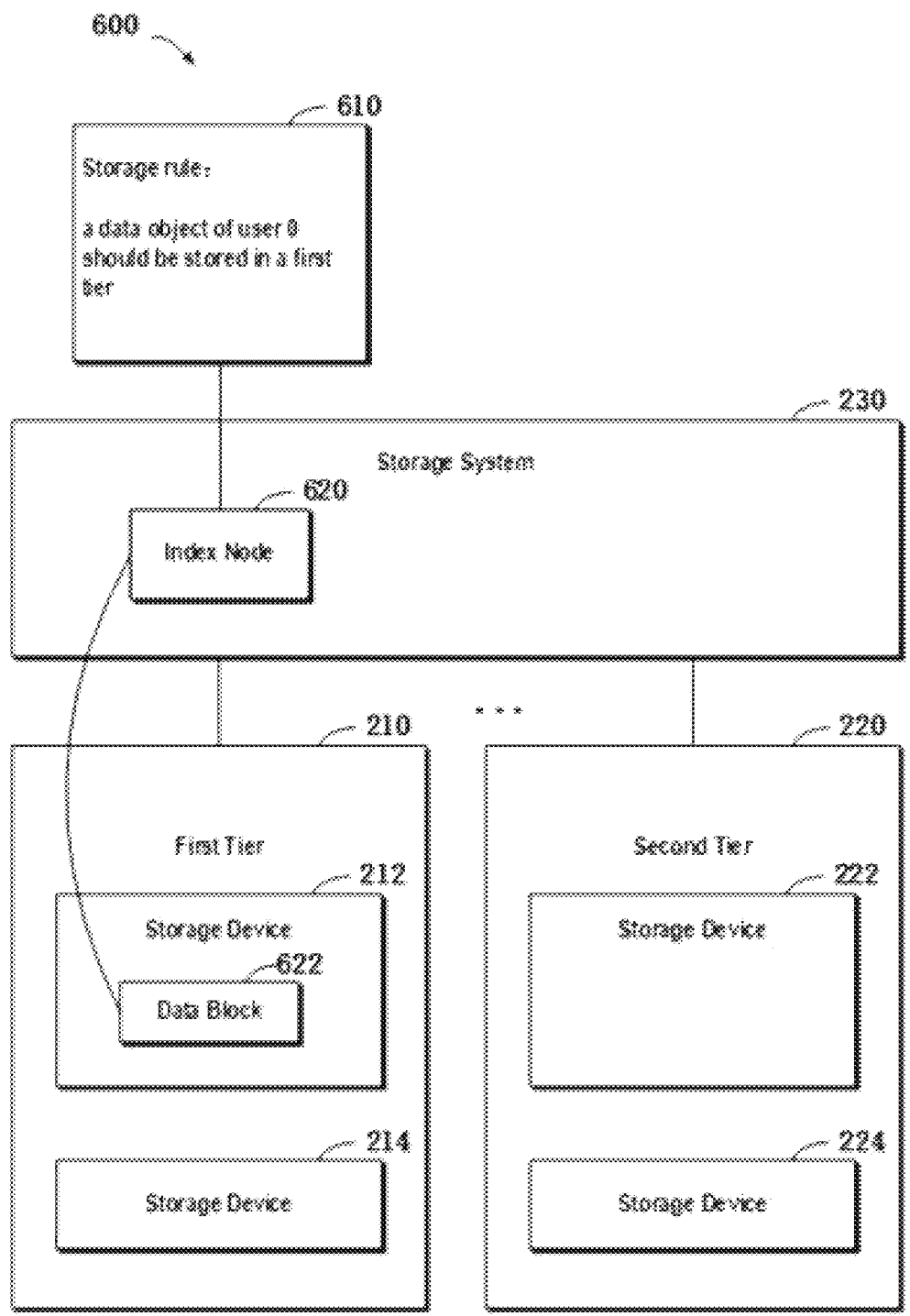
FIG. 6 schematically illustrates a block diagram for storing a data object to a storage system on the basis of storage rules according to one implementation of the present disclosure.

FIG. 6 schematically shows a block diagram 600 for storing the data object 320 to the storage system 230 on the basis of the storage rule 314 according to one implementation of the present disclosure. As shown in FIG. 6, suppose a storage rule 610 defines a data object of user 0 should be stored in the first tier, a data object 620 may be stored in a storage device (e.g., the storage device 212) in the first tier 210 in the storage system 230. It is noteworthy that an index node 620 may be inserted into indexes in the storage system 230, and the index node 620 comprises a pointer 622 pointing to a data block 622.

It is noteworthy although only one data block 622 is shown in this implementation, in other implementation the data object 320 may further comprise more data blocks, depending on the size of the data object 320. Moreover, the present disclosure does not care about the physical position of the index node 620. For example, the index node 620 may be located in a storage device in any tier in the storage system 230, or may further be located in a cache.

The implementation of storing the data object 320 in the storage system 230 on the basis of the storage rule 314 has been described in detail. Hereinafter, a detailed description will be presented to how to migrate the data object 320 in the storage system 230 on the basis of the storage rule 314.

In one implementation of the present disclosure, a state of the data object 320 in the storage system 230 may be monitored. The state mentioned here may be various states associated with the data object 320, such as a size of the data object 320, a time when or a frequency at which the data object 320 is read/modified, etc. If it is determined that the state satisfies the storage rule 314, then the data object 320 may be migrated in the storage system 230 on the basis of a source tier and a destination tier specified in the storage rule 314. The migration means migrate the data object 320 from a storage device in the source tier to a storage device in the destination tier, so as to satisfy user requirements on the response speed of the storage system and the like.

In one implementation of the present disclosure, storage devices in the source tier and the destination tier have different response efficiency, respectively. When the data object 320 is stored in a storage device with lower response efficiency, if the data object 320 is accessed frequently, then at this point the lower response efficiency will affect the overall response efficiency of the storage system 230. Therefore, the data object 320 may be migrated to a storage device with higher response efficiency.

According to one implementation of the present disclosure, depending on whether access to the data object 320 satisfies a first predefined condition in the storage rule 314, it may be determined whether to migrate the data object 320 from the storage device in the source tier to the storage device in the destination tier. For example, response efficiency of the first tier 210 in the storage system 230 is lower, and response efficiency of the second tier 210 is higher. Suppose the storage rule 314 defines: when the access frequency exceeds a specific threshold, an associated data object should be migrated from the first tier 210 to the second tier. At this point, the first tier 210 is a source tier, and the second tier 220 is a destination tier. By migrating the data object 320 from a storage device in the first tier 210 to a storage device in the second tier 220, the response efficiency of the storage system 230 may be improved.

In one implementation of the present disclosure, storage devices in the source tier and the destination tier have different storage capacities. For example, the storage device in the first tier 210 may have a larger storage capacity, while the storage device in the second tier 220 may have a smaller storage capacity. At this point, in response to the size of the data object satisfying a second predefined condition in the storage rule, the data object is migrated from the storage device in the source tier to the storage device in the destination tier. Suppose the storage rule 314 defines: when the size of a data object exceeds a specific threshold, the data object is migrated from the second tier 220 to the first tier 210. At this point, the second tier 220 is a source tier, and the first tier 210 is a destination tier. By migrating the data object 320 from the storage device in the second tier 220 to the storage device in the first tier 210, a shortage of storage capacity in the second tier 220 may be alleviated.

In one implementation of the present disclosure, the migrating the data object 320 in the storage system 230 on the basis of a source tier and a destination tier specified in the storage rule 314 comprises: in response to the data object 320 being "dirty data," synchronizing data associated in the data object 320 in a cache of the storage system 230 to the data object 320; and migrating the data object 320 from the storage device in the source tier to the storage device in the destination tier.

In the context of the present disclosure, when contents in the data object 320 change, the data object 320 is marked as "dirty data." At this point, the data object 320 needs to be modified using latest data saved in the cache of the storage system 230. Subsequently, contents in the modified data object become fresh, and a migration may be performed on the basis of the latest contents.

In one implementation of the present disclosure, a temporary node is created in the cache of the storage system 230. A data structure of the temporary node may be similar to a structure of the index node in indexes of the storage system 230. Next, contents of the data object 230 are copied from the storage device in the source tier to at least one data block in the storage device in the destination tier. At this point, the number of data blocks depends on the size of the data object 320 and the size of a data block in the storage system 230.

The temporary node is linked to the at least one block. In this step, a pointer pointing to the at least one data block may be recorded in the temporary node. Then, a position of the migrated data object in the storage system 230 may be determined by the temporary node. Finally, contents in the temporary node may be copied to an index node associated with the data object 320 among indexes of the storage system 230. In this way, the index node associated with the data object 320 is linked to an address of the migrated data object, so the migrated data object can be accessed by querying an index.

In one implementation of the present disclosure, during copying the data object 320, the data object 320 may further be locked in order to prevent contents of the data object 320 from being modified during a migration. If a request for accessing the data object 320 is received during the migration, then the request may be delayed, or the request may be handled in other manner.

In one implementation of the present disclosure, a data block to which the index node points may be released; and contents in the temporary node may be copied to the index node. As the data object 320 has been migrated from the storage device in the source tier to the storage device in the destination tier, corresponding space in the storage device in the source tier may be released. The released storage space may be for other usage. Subsequently, contents in the temporary node may be copied to an index node corresponding to the data object 320 among indexes. At this point, the index node is linked to the migrated data object 320.

Figure 7:
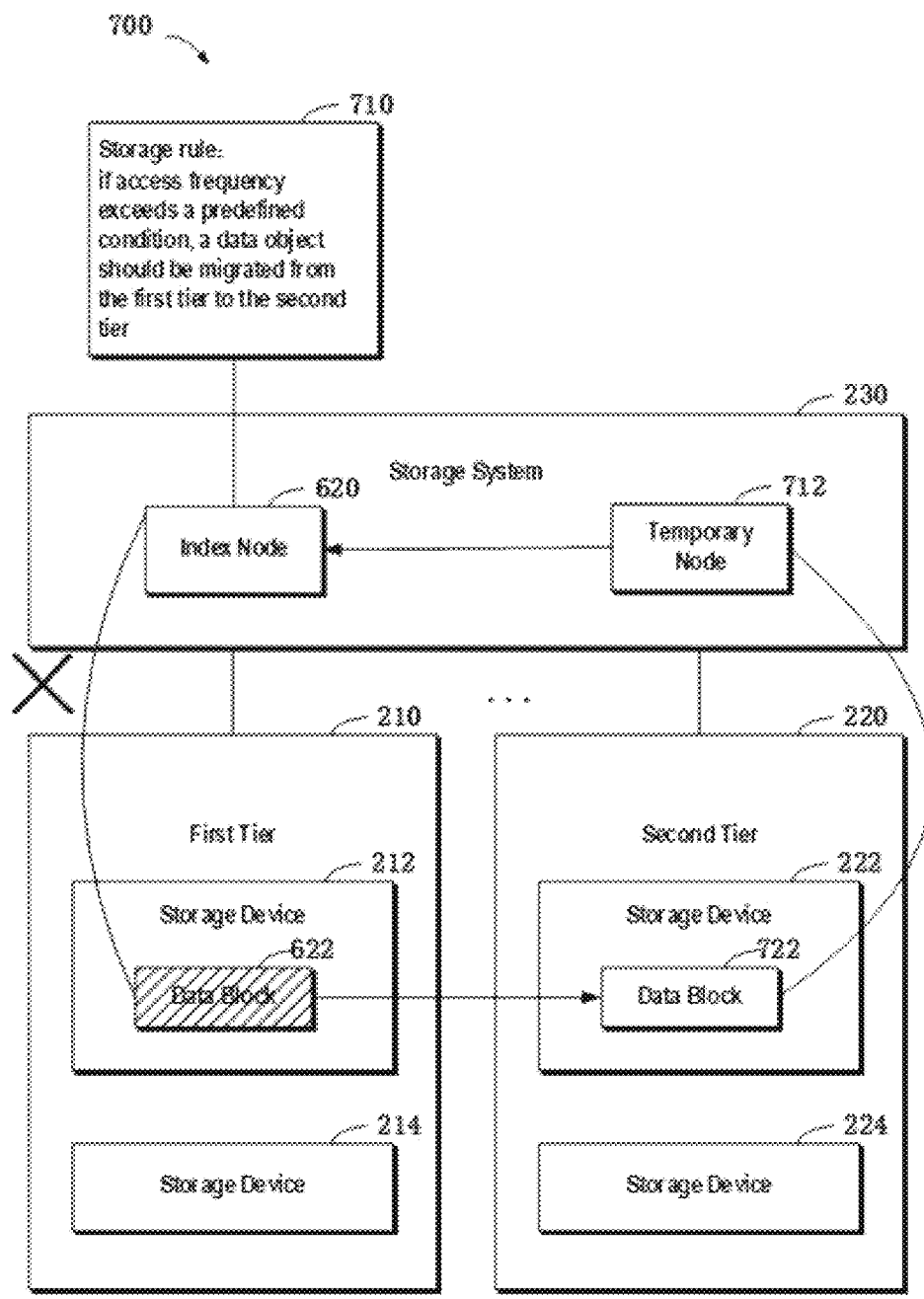
FIG. 7 schematically illustrates a block diagram for migrating a data object in a storage system on the basis of storage rules according to one implementation of the present disclosure.

FIG. 7 schematically shows a block diagram 700 for migrating the data object 320 in the storage system 230 on the basis of a storage rule according to one implementation of the present disclosure. As shown in FIG. 7, suppose a storage rule 710 defines: if the frequency of access to the data object 320 exceeds a predefined condition, then the data object 320 is migrated from a first tier to a second tier.

Before a migration, an index node corresponding to the data object 320 is an index node 620, and the index node 620 is linked to a data block 622 in the storage device 212 in the first tier 210. During the migration, a temporary node 712 is first created. Contents of the data block 622 are copied to a data block 722 in the storage device 222 in the second tier 220, and the temporary node 712 is linked to the data block 722. Storage space occupied by the data block 622 may be released, and contents in the temporary node 712 are copied to the index node 620. At this point, a link relationship between the index node 620 and the data block 622 will be removed.

The various implementations implementing the method of the present invention have been described above with reference to the accompanying drawings. Those skilled in the art may understand the method may be implemented in software, hardware or a combination of software and hardware. Moreover, those skilled in the art may understand by implementing various steps in the above method in software, hardware or a combination of software and hardware, there may be provided a device based on the same invention concept. Even if the device has the same hardware structure as a general-purpose processing device, the functionality of software contained therein makes the device manifest distinguishing properties from the general-purpose processing device, thereby forming a device of the various implementations of the present invention. The device described in the present invention comprises several means or modules, which are configured to execute corresponding steps. Upon reading this specification, those skilled in the art may understand how to write a program for implementing actions performed by these means or modules. Since the device is based on the same invention concept as the method, the same or corresponding implementation details are also applicable to means or modules corresponding to the method. As a detailed and complete description has been presented above, it might be ignored below.

In one implementation of the present disclosure, there is disclosed a method for managing a storage system. The method comprises: obtaining topological information of a storage device in a first tier and a storage device in a second tier in the storage system; obtaining a storage rule specifying storage of a data object in the storage device in the first tier or the storage device in the second tier; and in response to determining the storage rule conforming to the topological information, managing the data object in the storage system according to the storage rule.

In one implementation of the present disclosure, the determining the storage rule conforming to the topological information comprises: in response to the topological information comprising a storage device in a tier specified by the storage rule, determining the storage rule conforming to the topological information.

In one implementation of the present disclosure, the managing the data object in the storage system according to the storage rule comprises: in response to receiving a storage request for storing the data object in the storage system, allocating at least one data block for the data object in a storage device in a tier specified by the storage rule; and inserting an index node to indexes of the storage system, the index node being linked to the at least one data block.

In one implementation of the present disclosure, the managing the data object in the storage system according to the storage rule comprises: monitoring a state of the data object in the storage system; and in response to the state satisfying the storage rule, migrating the data object in the storage system on the basis of a source tier and a destination tier specified by the storage rule.

In one implementation of the present disclosure, storage devices in the source tier and the destination tier have different response efficiency respectively, and the migrating the data object comprises: in response to access to the data object satisfying a first predefined condition in the storage rule, migrating the data object from a storage device in the source tier to a storage device in the destination tier.

In one implementation of the present disclosure, storage devices in the source tier and the destination tier have different response efficiency, and the migrating the data object comprises: in response to a size of the data object satisfying a second predefined condition in the storage rule, migrating the data object from a storage device in the source tier to a storage device in the destination tier.

In one implementation of the present disclosure, the migrating the data object in the storage system on the basis of a source tier and a destination tier specified by the storage rule comprises: in response to the data object being "dirty data," synchronizing data associated with the data object in a cache of the data object to the data object; and migrating the data object from a storage device in the source tier to a storage device in the destination tier.

In one implementation of the present disclosure, the migrating the data object comprises: creating a temporary node in a cache of the storage system; copying contents of the data object from a storage device in the source tier to at least one data block in a storage device in the destination tier; linking the temporary node to the at least one data block; and copying contents in the temporary node to an index node associated with the data object among indexes of the storage system.

In one implementation of the present disclosure, the data object is locked during copying the data object.

In one implementation of the present disclosure, the copying contents in the temporary node further comprises: releasing a data block to which the index node points; and copying contents in the temporary node to the index node.

Figure 8:
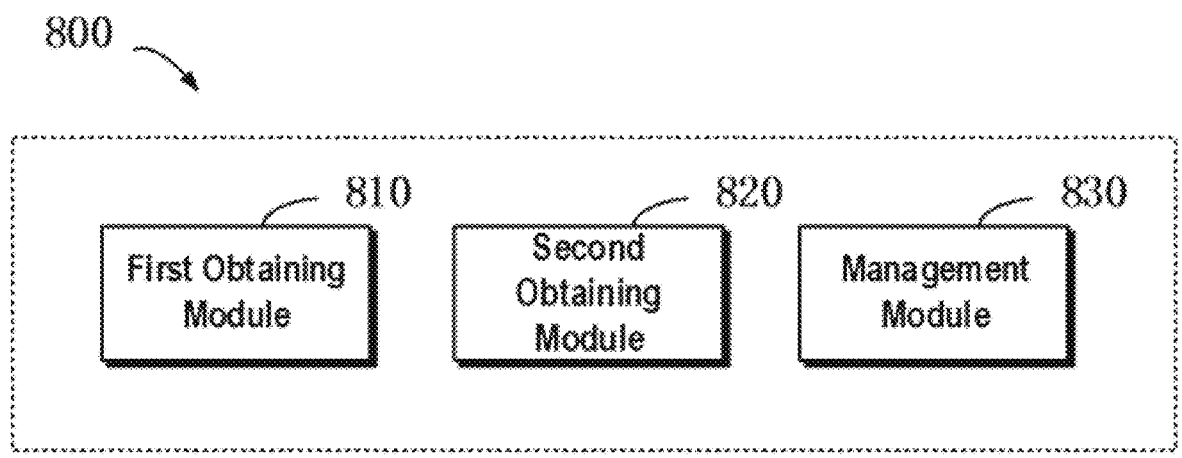
FIG. 8 schematically illustrates a block diagram of a device for managing a storage system according to one implementation of the present disclosure.

FIG. 8 schematically shows a block diagram of a device 800 for managing a storage system according to one implementation of the present disclosure. The device 800 comprises: a first obtaining module 810 configured to obtain topological information of a storage device in a first tier and a storage device in a second tier in the storage system; a second obtaining module 820 configured to obtain a storage rule specifying storage of a data object in the storage device in the first tier or the storage device in the second tier; and a management module 830 configured to, in response to determining the storage rule conforming to the topological information, manage the data object in the storage system according to the storage rule.

In one implementation of the present disclosure, the management module 830 is further configured to: in response to the topological information comprising a storage device in a tier specified by the storage rule, determine the storage rule conforming to the topological information.

In one implementation of the present disclosure, the management module 830 is further configured to: in response to receiving a storage request for storing the data object in the storage system, allocate at least one data block for the data object in a storage device in a tier specified by the storage rule; and insert an index node to indexes of the storage system, the index node being linked to the at least one data block.

In one implementation of the present disclosure, the management module 830 is further configured to: monitor a state of the data object in the storage system; and in response to the state satisfying the storage rule, migrate the data object in the storage system on the basis of a source tier and a destination tier specified by the storage rule.

In one implementation of the present disclosure, storage devices in the source tier and the destination tier have different response efficiency, and the management module 830 is further configured to: in response to access to the data object satisfying a first predefined condition in the storage rule, migrate the data object from a storage device in the source tier to a storage device in the destination tier.

In one implementation of the present disclosure, storage devices in the source tier and the destination tier have different response efficiency, and the management module 830 is further configured to: in response to a size of the data object satisfying a second predefined condition in the storage rule, migrate the data object from a storage device in the source tier to a storage device in the destination tier.

In one implementation of the present disclosure, the management module 830 is further configured to: in response to the data object being "dirty data," synchronize data associated with the data object in a cache of the data object to the data object; and migrate the data object from a storage device in the source tier to a storage device in the destination tier.

In one implementation of the present disclosure, the management module 830 is further configured to: create a temporary node in a cache of the storage system; copy contents of the data object from a storage device in the source tier to at least one data block in a storage device in the destination tier; link the temporary node to the at least one data block; and copying contents in the temporary node to an index node associated with the data object among indexes of the storage system.

In one implementation of the present disclosure, the management module 830 is further configured to lock the data object during copying the data object.

In one implementation of the present disclosure, the management module 830 is further configured to: release a data block to which the index node points; and copy contents in the temporary node to the index node.

In one implementation of the present invention, there is provided a system for managing a storage system, comprising: one or more processors; a memory coupled to at least one processor of the one or more processors; computer program instructions stored in the memory which, when executed by the at least one processor, cause the system to execute a method for managing a storage system. The method comprises: obtaining topological information of a storage device in a first tier and a storage device in a second tier in the storage system; obtaining a storage rule specifying storage of a data object in the storage device in the first tier or the storage device in the second tier; and in response to determining the storage rule conforming to the topological information, managing the data object in the storage system according to the storage rule.

In one implementation of the present disclosure, the determining the storage rule conforming to the topological information comprises: in response to the topological information comprising a storage device in a tier specified by the storage rule, determining the storage rule conforming to the topological information.

In one implementation of the present disclosure, the managing the data object in the storage system according to the storage rule comprises: in response to receiving a storage request for storing the data object in the storage system, allocating at least one data block for the data object in a storage device in a tier specified by the storage rule; and inserting an index node to indexes of the storage system, the index node being linked to the at least one data block.

In one implementation of the present disclosure, the managing the data object in the storage system according to the storage rule comprises: monitoring a state of the data object in the storage system; and in response to the state satisfying the storage rule, migrating the data object in the storage system on the basis of a source tier and a destination tier specified by the storage rule.

In one implementation of the present disclosure, storage devices in the source tier and the destination tier have different response efficiency, and the migrating the data object comprises: in response to access to the data object satisfying a first predefined condition in the storage rule, migrating the data object from a storage device in the source tier to a storage device in the destination tier.

In one implementation of the present disclosure, storage devices in the source tier and the destination tier have different response efficiency, and the migrating the data object comprises: in response to a size of the data object satisfying a second predefined condition in the storage rule, migrating the data object from a storage device in the source tier to a storage device in the destination tier.

In one implementation of the present disclosure, the migrating the data object in the storage system on the basis of a source tier and a destination tier specified by the storage rule comprises: in response to the data object being "dirty data," synchronizing data associated with the data object in a cache of the data object to the data object; and migrating the data object from a storage device in the source tier to a storage device in the destination tier.

In one implementation of the present disclosure, the migrating the data object comprises: creating a temporary node in a cache of the storage system; copying contents of the data object from a storage device in the source tier to at least one data block in a storage device in the destination tier; linking the temporary node to the at least one data block; and copying contents in the temporary node to an index node associated with the data object among indexes of the storage system.

In one implementation of the present disclosure, the data object is locked during copying the data object.

In one implementation of the present disclosure, the copying contents in the temporary node further comprises: releasing a data block to which the index node points; and copying contents in the temporary node to the index node.

In one implementation of the present invention, there is provided a computer program product, tangibly stored on a non-transient computer readable medium and including machine executable instructions which, when being executed, cause the machine to execute steps of the method described above.

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

The invention claimed is:

1. A method for managing a storage system, the method comprising:
   obtaining topological information of a first storage device in a first tier and a second storage device in a second tier in the storage system;
   obtaining a storage rule specifying storage of a data object in the first storage device in the first tier or the second storage device in the second tier; and
   in response to determining the storage rule conforming to the topological information, managing the data object in the storage system according to the storage rule;
   wherein:
   the storage system includes a plurality of storage devices including the first storage device and the second storage device;
   the storage system includes a plurality of tiers including the first tier and the second tier; and
   the topological information describes a dynamic mapping relationship between each storage device of the plurality of storage devices and the storage system, the dynamic mapping relationship defining a particular tier to which each storage device of the plurality of storage devices belongs.

2. The method according to claim 1, wherein the determining the storage rule conforming to the topological information comprises:
   in response to the topological information comprising a storage device in a tier specified by the storage rule, determining the storage rule conforming to the topological information.

3. The method according to claim 1, wherein the managing the data object in the storage system according to the storage rule comprises:
   in response to receiving a storage request for storing the data object in the storage system, allocating at least one data block for the data object in a storage device in a tier specified by the storage rule; and
   inserting an index node to indexes of the storage system, the index node being linked to the at least one data block.

4. The method according to claim 1, wherein the managing the data object in the storage system according to the storage rule comprises:
   monitoring a state of the data object in the storage system; and
   in response to the state satisfying the storage rule, migrating the data object in the storage system on the basis of a source tier and a destination tier specified by the storage rule.

5. The method according to claim 4, wherein storage devices in the source tier and the destination tier have different response efficiency respectively, and the migrating the data object comprises:
   in response to access to the data object satisfying a first predefined condition in the storage rule, migrating the data object from a storage device in the source tier to a storage device in the destination tier.

6. The method according to claim 4, wherein storage devices in the source tier and the destination tier have different response efficiency respectively, and the migrating the data object comprises:
   in response to a size of the data object satisfying a second predefined condition in the storage rule, migrating the data object from a storage device in the source tier to a storage device in the destination tier.

7. The method according to claim 6, wherein the migrating the data object comprises:
creating a temporary node in a cache of the storage system;
copying contents of the data object from a storage device in the source tier to at least one data block in a storage device in the destination tier;
linking the temporary node to the at least one data block; and
copying contents in the temporary node to an index node associated with the data object among indexes of the storage system.

8. The method according to claim 7, further comprising:
locking the data object during copying the data object.

9. The method according to claim 7, wherein the copying contents in the temporary node further comprises:
releasing a data block to which the index node points; and
copying contents in the temporary node to the index node.

10. The method according to claim 4, wherein the migrating the data object in the storage system on the basis of a source tier and a destination tier specified by the storage rule comprises:
in response to the data object being "dirty data," synchronizing data associated with the data object in a cache of the data object to the data object; and
migrating the data object from a storage device in the source tier to a storage device in the destination tier.

11. The method according to claim 1 wherein:
each storage rule makes reference to a set of one or more tiers;
obtaining the storage rule includes identifying all tiers referenced by the storage rule; and
determining the storage rule conforming to the topological information includes, for each tier referenced by the storage rule, determining that the dynamic mapping relationship defines at least one storage device as belonging to that tier.

12. A system for managing a storage system, comprising:
one or more processors;
a memory coupled to at least one processor of the one or more processors; and
computer program instructions stored in the memory which, when executed by the at least one processor, cause the system to execute a method for managing the storage system, the method comprising:
obtaining topological information of a first storage device in a first tier and a second storage device in a second tier in the storage system;
obtaining a storage rule specifying storage of a data object in the first storage device in the first tier or the second storage device in the second tier; and
in response to determining the storage rule conforming to the topological information, managing the data object in the storage system according to the storage rule;
wherein:
the storage system includes a plurality of storage devices including the first storage device and the second storage device;
the storage system includes a plurality of tiers including the first tier and the second tier; and
the topological information describes a dynamic mapping relationship between each storage device of the plurality of storage devices and the storage system, the dynamic mapping relationship defining a particular tier to which each storage device of the plurality of storage devices belongs.

13. The system according to claim 12, wherein the determining the storage rule conforming to the topological information comprises:
in response to the topological information comprising a storage device in a tier specified by the storage rule, determining the storage rule conforming to the topological information.

14. The system according to claim 12, wherein the managing the data object in the storage system according to the storage rule comprises:
in response to receiving a storage request for storing the data object in the storage system, allocating at least one data block for the data object in a storage device in a tier specified by the storage rule; and
inserting an index node to indexes of the storage system, the index node being linked to the at least one data block.

15. The system according to claim 12, wherein the managing the data object in the storage system according to the storage rule comprises:
monitoring a state of the data object in the storage system; and
in response to the state satisfying the storage rule, migrating the data object in the storage system on the basis of a source tier and a destination tier specified by the storage rule.

16. The system according to claim 15, wherein storage devices in the source tier and the destination tier have different response efficiency respectively, and the migrating the data object comprises:
in response to access to the data object satisfying a first predefined condition in the storage rule, migrating the data object from a storage device in the source tier to a storage device in the destination tier.

17. The system according to claim 15, wherein storage devices in the source tier and the destination tier have different response efficiency, and the migrating the data object comprises:
in response to a size of the data object satisfying a second predefined condition in the storage rule, migrating the data object from a storage device in the source tier to a storage device in the destination tier.

18. The system according to claim 17, wherein the migrating the data object comprises:
creating a temporary node in a cache of the storage system;
copying contents of the data object from a storage device in the source tier to at least one data block in a storage device in the destination tier;
linking the temporary node to the at least one data block; and
copying contents in the temporary node to an index node associated with the data object among indexes of the storage system.

19. The system according to claim 18, wherein the method further comprises:
locking the data object during copying the data object.

20. The system according to claim 18, wherein the copying contents in the temporary node further comprises:
releasing a data block to which the index node points; and
copying contents in the temporary node to the index node.

21. The system according to claim 15, wherein the migrating the data object in the storage system on the basis of a source tier and a destination tier specified by the storage rule comprises:

in response to the data object being "dirty data," synchronizing data associated with the data object in a cache of the data object to the data object; and migrating the data object from a storage device in the source tier to a storage device in the destination tier.

22. The system according to claim 12 wherein:

each storage rule makes reference to a set of one or more tiers;

obtaining the storage rule includes identifying all tiers referenced by the storage rule; and determining the storage rule conforming to the topological information includes, for each tier referenced by the storage rule, determining that the dynamic mapping relationship defines at least one storage device as belonging to that tier.

* * * * *